(12) United States Patent
Xiao et al.

(10) Patent No.: US 12,443,489 B2
(45) Date of Patent: Oct. 14, 2025

(54) OFFLOADING REDO LOG PROCESSING TO SOLID-STATE DRIVES IN DATABASE SYSTEMS

(71) Applicant: SAP SE, Walldorf (DE)

(72) Inventors: Zhiwei Xiao, Xi'an (CN); BianHong Zheng, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/585,452

(22) Filed: Feb. 23, 2024

(65) Prior Publication Data

US 2025/0272197 A1 Aug. 28, 2025

(51) Int. Cl.
*G06F 11/14* (2006.01)

(52) U.S. Cl.
CPC ...... *G06F 11/1456* (2013.01); *G06F 11/1471* (2013.01); *G06F 2201/80* (2013.01)

(58) Field of Classification Search
CPC ............. G06F 11/1456; G06F 11/1471; G06F 2201/80
See application file for complete search history.

(56) References Cited

U.S. PATENT DOCUMENTS

2017/0083411 A1* 3/2017 Berinde ............... G06F 11/1402
2018/0253468 A1* 9/2018 Gurajada ............ G06F 16/2255

* cited by examiner

*Primary Examiner* — Apu M Mofiz
*Assistant Examiner* — Cindy Nguyen
(74) *Attorney, Agent, or Firm* — Fish & Richardson P.C.

(57) ABSTRACT

Methods, systems, and computer-readable storage media for receiving, by a SSD from a host, a write command to write content to memory, the content including a redo log of a database system, the redo log including a set of redo entries, each redo entry recording one or more changes to data in the database system, writing, by a redo log processor executed by the SSD, redo entries of the redo log to a redo log buffer, the redo log buffer comprising a page identifier (page ID) ordered array and a set of bidirectional linked tables, the redo entries being written to the bidirectional linked tables in the set of bidirectional linked tables, and executing, by the redo log processor, one or more of creating a data page and updating a data page in memory of the SSD, the data page being stored in memory of the SSD.

20 Claims, 5 Drawing Sheets

OFFLOADING REDO LOG PROCESSING TO SOLID-STATE DRIVES IN DATABASE SYSTEMS

BACKGROUND

Database systems organize data that is stored in a database. Transactions can be executed on the data to, for example, read data from and/or write data to the database. In many cases, the database system is executed by a host, which includes a computing device in, for example, a cloud computing environment. The database system logs changes to records in redo logs and undo logs. A redo log protects the database from loss of integrity that can result from system failures (e.g., caused by power outages), disk failures, and the like. If such an event occurs, a recovery process can be executed across all transactions, both uncommitted as well as committed, to the stored data-files using the information in the redo log.

SUMMARY

Implementations of the present disclosure are directed to data processing in database systems. More particularly, implementations of the present disclosure are directed to offloading processing of redo logs from hosts to storage to reduce data transfer between hosts and storage.

In some implementations, actions include receiving, by a solid-state drive (SSD) and from a host, a write command to write content to memory, the content including a redo log of a database system, the redo log including a set of redo entries, each redo entry recording one or more changes to data in the database system, writing, by a redo log processor executed by at least one processor of the SSD, redo entries of the redo log to a redo log buffer, the redo log buffer comprising a page identifier (page ID) ordered array and a set of bidirectional linked tables, the redo entries being written to the bidirectional linked tables in the set of bidirectional linked tables, and executing, by the redo log processor, one or more of creating a data page and updating a data page in memory of the SSD, the data page being stored in memory of the SSD. Other implementations of this aspect include corresponding systems, apparatus, and computer programs, configured to perform the actions of the methods, encoded on computer storage devices.

These and other implementations can each optionally include one or more of the following features: a sub-set of bidirectional linked tables stores a set of redo entries corresponding to a respective page ID; one or more redo entries in the set of redo entries includes a pointer that points to one other redo entry in the set of redo entries; each page ID in the page ID ordered array includes a pointer to a last redo entry in the set of bidirectional linked tables corresponding to the page ID; the data page is identified by a page ID in the page ID ordered array; a plurality of redo entries associated with a page ID are all processed by a same thread of the SSD to execute one or more of creating a data page and updating a data page; and the host executes a database engine that processes queries, the write command being transmitted to the SSD in response to a query.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to data processing in database systems. More particularly, implementations of the present disclosure are directed to offloading processing of redo logs from hosts to storage to reduce data transfer between hosts and storage. Implementations can include actions of receiving, by a solid-state drive (SSD) and from a host, a write command to write content to memory, the content including a redo log of a database system, the redo log including a set of redo entries, each redo entry recording one or more changes to data in the database system, writing, by a redo log processor executed by at least one processor of the SSD, redo entries of the redo log to a redo log buffer, the redo log buffer comprising a page identifier (page ID) ordered array and a set of bidirectional linked tables, the redo entries being written to the bidirectional linked tables in the set of bidirectional linked tables, and executing, by the redo log processor, one or more of creating a data page and updating a data page in memory of the SSD, the data page being stored in memory of the SSD.

To provide further context for implementations of the present disclosure, and as introduced above, database systems organize data that is stored in a database. Transactions can be executed on the data to, for example, read data from and/or write data to the database. In many cases, the database system is executed by a host, which includes a computing device in, for example, a cloud computing environment. The database system logs changes to records in a redo log and an undo log. The redo log protects the database from loss of integrity that can result from system failures (e.g., caused by power outages), disk failures, and the like. If such an event occurs, a recovery process can be executed across all transactions, both uncommitted as well as committed, to the stored data-files using the information in the redo log.

More particularly, redo logs include redo entries that record a history of changes made to the database. In some examples, each redo entry records a set of change vectors, each change vector being descriptive of a change made to a single block in the database. By way of non-limiting example, if an UPDATE to a value in a table is executed, a redo entry is generated that includes change vectors that describe changes to the data segment block for the table. Each redo entry only records changes that are committed. If the database crashes, the database system can re-process (redo) all changes on datafiles using the redo logs. In this manner, the database can be restored to the state it was in when the last redo entry was written.

In modern computer architectures, storage devices have been strictly separated from hosts and interact with each other through a block input/output (I/O) interface. The dichotomy of host and storage has forced database engines to detach their data processing logic from storage. As a result, a database engine executed on the host takes the responsibility of computing. This can include bringing data from storage to host, reading and/or updating data, and then writing updated data back to storage for durability. This includes writing data pages, undo logs, and redo logs to storage.

Traditionally, storage media included hard disks. However, as SSDs increasingly replace hard disks as the main storage media, this traditional architecture of separating compute and storage becomes more and more undesirable. This is largely because I/O stacks can account for more than half of the data access latency on SSDs even with numerous I/O stack optimizations.

In view of the above context, implementations of the present disclosure provide for offloading of processing of redo logs from the host to SSD. In accordance with implementations of the present disclosure, and as discussed in further detail herein, the database engine only writes redo log entries to the SSD instead of also writing data pages and/or undo logs. The SSD updates data pages and/or creates data pages based on entries of the redo log. Accordingly, the entirety of redo processing is offloaded from the database engine to the SSD. As a result, writing data pages and undo logs from the host to storage is obviated. That is, only the redo log is transmitted from the host to the SSD. In this manner, communication bandwidth is conserved and latency between the host and storage is reduced.

Figure 1:
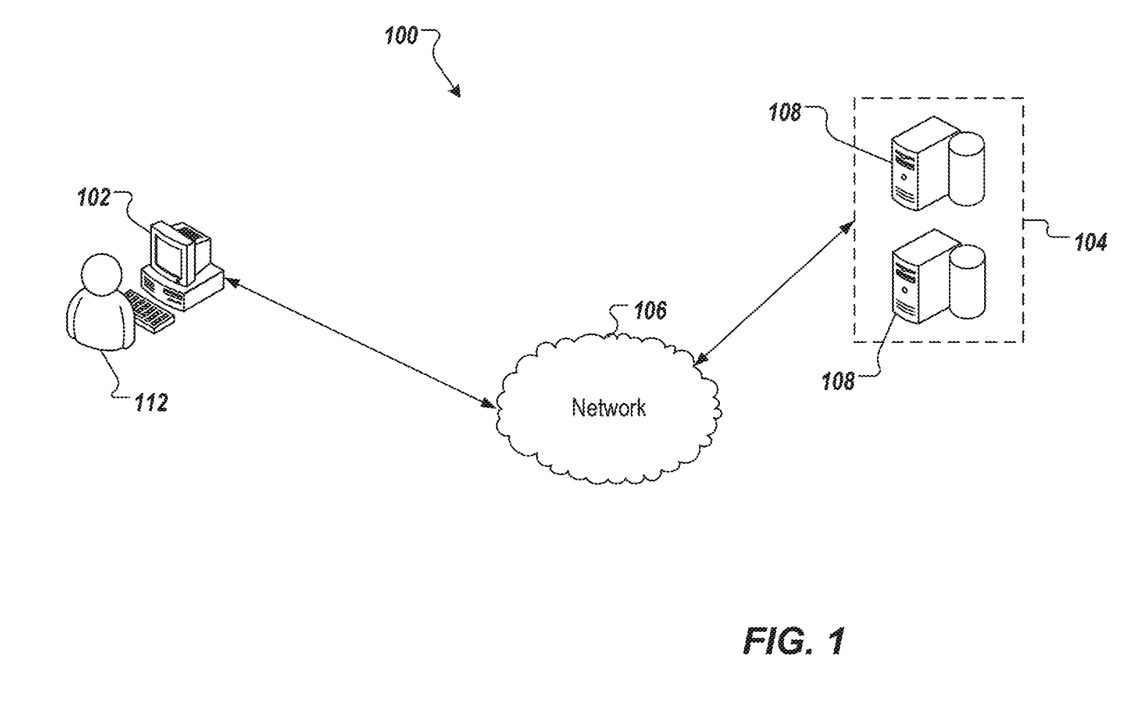
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a database system that can include one or more hosts and one or more storage devices. The storage devices can include SSDs. A host can execute a database engine that transfers redo logs to the SSD, in which data of the database system is stored. In accordance with implementations of the present disclosure, the SSD processes the redo logs to update data pages and/or create data pages based on entries of the redo logs.

Figure 2:
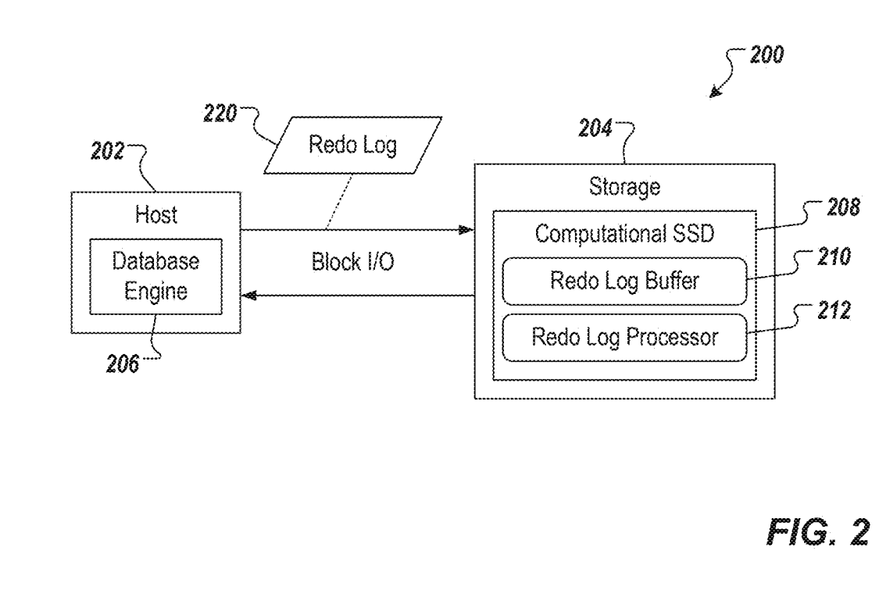
FIG. 2 depicts example communication between a host and storage in accordance with implementations of the present disclosure.

FIG. 2 depicts example communication 200 between a host 202 and storage 204 in accordance with implementations of the present disclosure. The host 202 and the storage 204 communicate through a block I/O interface. In the example of FIG. 2, the host 202 executes a database engine 206. In general, the database engine 206 creates, reads, updates, and/or deletes data from a database. For example, the database engine 206 processes queries (e.g., Structured Query Language (SQL) queries). In some examples, processing of the queries results in execution of transactions on data in the database system (e.g., creating, reading, updating, and/or deleting data).

In accordance with the present disclosure, the storage 204 includes a SSD 208. The SSD 208 stores data in computer-readable memory. For example, data is stored in data pages, each data page can be of a predetermined size (e.g., 64 KB, 128 KB, 256 KB, 512 KB). Each data page is uniquely identified using a page identifier (page ID). In some examples, the SSD 208 is provided as a computational SSD, which can be described as a storage device that not only stores data, but is also capable of executing computer code to perform computational functionality. In some examples, the SSD 208 includes a controller (which includes one or more processors), dynamic random-access memory (DRAM), and flash memory (e.g., not and (NAND) flash memory). In some examples, data pages of the database are stored in the flash memory.

In accordance with the present disclosure, the SSD 208 includes redo log buffer 210 and a redo log processor 212. In some examples, the redo log buffer 210 is stored in the DRAM of the SSD 208. In some examples, the redo log processor 212 is provided as computer-executable code that processes redo logs as described in further detail herein. In some implementations, source code of the redo log processor is compiled as firmware for the SSD controller and is offloaded down to a designated area in the NAND flash memory. In some examples, a bootloader of the SSD 208 loads the runtime binary of the redo log processor 212 to a designated area in DRAM upon booting. In some examples, heap memory of the redo log processor is stored in the DRAM. In some examples, the redo log buffer 210 is stored in the heap memory of the redo log processor 212.

Figure 3:
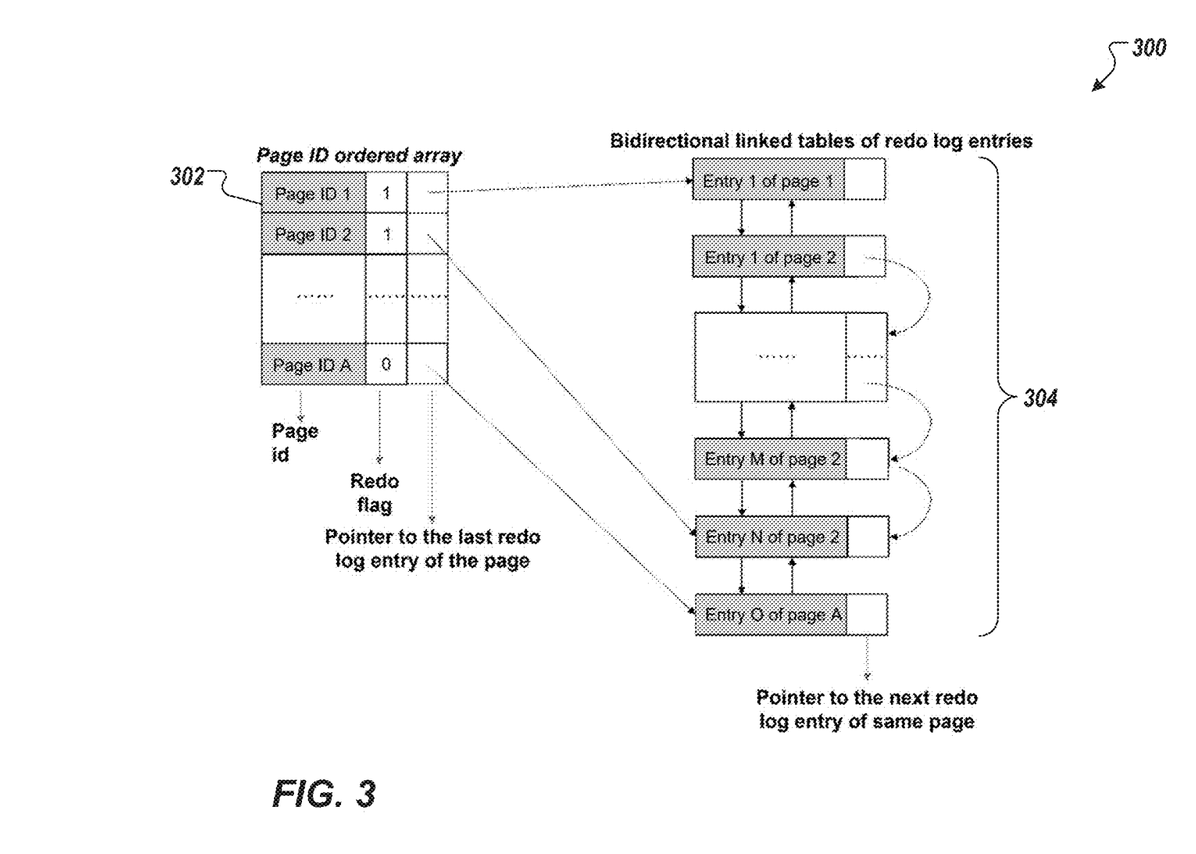
FIG. 3 depicts an example data structure of a redo log buffer in accordance with implementations of the present disclosure.

FIG. 3 depicts an example data structure 300 of a redo log buffer (e.g., the redo log buffer 210 of FIG. 2) in accordance with implementations of the present disclosure. In the depicted example, the redo log buffer includes a page ID ordered array 302 and bidirectional linked tables 304. The bidirectional linked tables 304 store the redo entries. In putting a redo entry into the redo log buffer, a page ID is extracted from the redo log and is inserted to the page ID ordered array 302, and the redo entry is added to the end of the bidirectional linked tables 304. In this manner, one page ID corresponds to multiple redo entries. As depicted in FIG. 3, each element of the page ID ordered array 304 contains a set of attributes. In some examples, the set of attributes includes a page ID, a redo flag, and pointer that points to the last redo entry of a respective page (e.g., the data page having the page ID). The redo flag indicates whether a thread is processing the respective page (e.g., 1 indicates that a thread is processing the page). Here, a thread is a thread of a processor of the SSD, which can include multiple threads (e.g., 8 threads). As also depicted in FIG. 3, bidirectional linked tables 304 of the redo log entries can include a pointer that points to the next redo entry of the same page. Using this attribute, a thread can process all redo entries for a data page. That is, a single thread processes all log entries of a data page.

Figure 4:
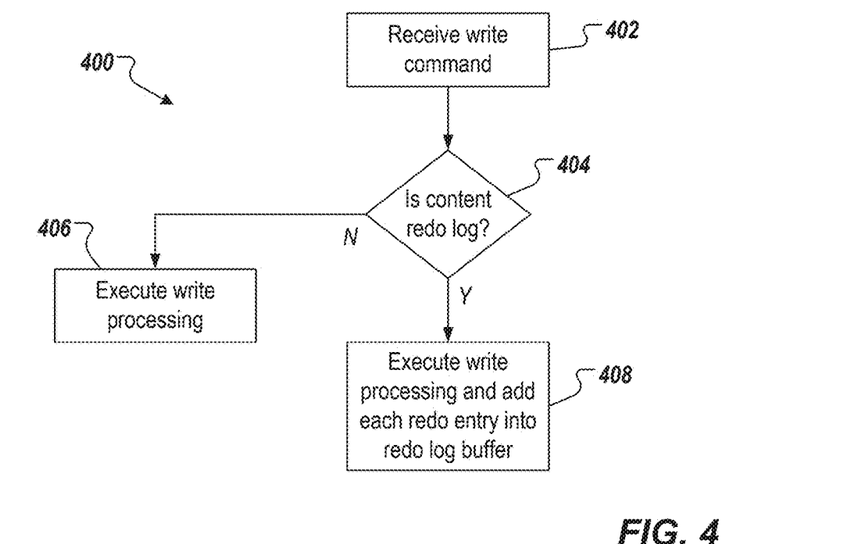
FIGS. 4 and 5 depict example processes that can be executed in accordance with implementations of the present disclosure.

FIG. 4 depicts an example process 400 that can be executed in accordance with implementations of the present disclosure. The example process 400 can be executed for write processing within a SSD (e.g., the SSD 208 of FIG. 2).

A write command with content is received (402). For example, and with reference to FIG. 2, the storage 204 receives a write command from the host 202, the write command including content. It is determined whether the content is a redo log (404).

In some examples, a mechanism (referred to as end-to-end data protection) is provided that, if enabled, additional protection information is added to the logical block that may be evaluated by the controller and/or host software to determine the integrity of the logical block. This additional protection information can include a field called "Application Tag," that can be set to a specified value, while the host writes redo logs to the SSD. The SSD can check the "Application Tag" field to find out if it is a write command that writes redo log. If the content is not a redo log, write processing is executed (406).

If the content is a redo log, the write processing is executed and each redo entry of the redo log is added to the redo log buffer in parallel (408). For example, for each redo entry of the redo log, the redo log processor 212 extracts a page ID and inserts the page ID into the page ID ordered array 302 of FIG. 3 and inserts the redo entry at the end of the bidirectional linked tables 304. If the page ID is already included in the page ID ordered array 302, the redo entry is inserted in the bidirectional linked tables 304, a pointer from the page ID ordered array 302 is adjusted to point to the added entry, and a pointer is added to point from a previous entry for the page ID to the added entry. As noted above, write processing and adding redo entries to the redo log buffer are performed in parallel. Here, parallel indicates that execution of write processing and adding redo entries at least partially overlap in time. In some examples, when a thread is created, the redo flag will be set to 1 from 0 before starting the first redo operation for a page. After the last redo log entry for this page has been processed, the element corresponding to the page ID will be removed from the Page ID order array. Consequently, the redo flag will not have a chance to change from 1 to 0.

Figure 5:
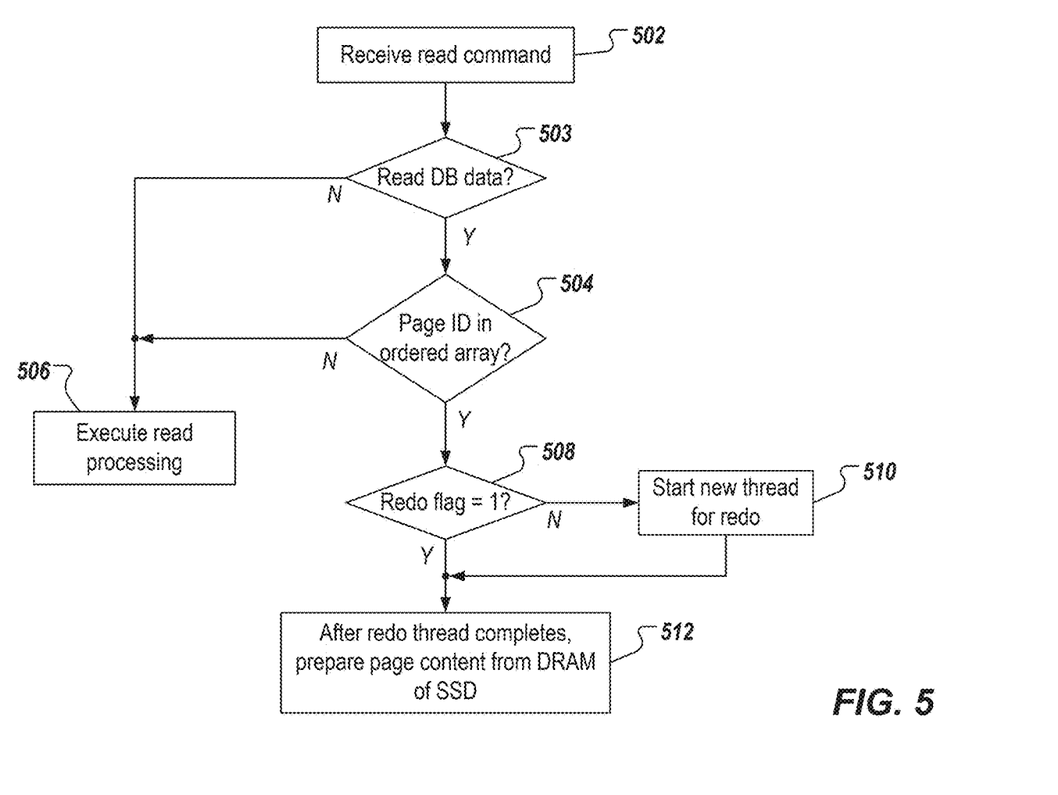

FIG. 5 depicts an example process 500 that can be executed in accordance with implementations of the present disclosure. The example process 500 can be executed for read processing within a SSD (e.g., the SSD 208 of FIG. 2).

A read command is received (502). For example, and with reference to FIG. 2, the storage 204 receives a read command from the host 202, the read command requesting data from at least one page ID. It is determined whether the read command is to read database data (503). For example, in some instances, the host reads normal files that have nothing to do with the database data. Here, the SSD first distinguishes whether it is a read command to read the database data, the same way as the write command (e.g., check the content of the "Application Tag" field). If it is determined that the read command is not to read database data, read processing is executed (506). If it is determined that the read command is to read database data, it is determined whether the page ID indicated in the read command is included in the page ID ordered array (504). For example, the redo log processor 212 of FIG. 2 determines whether the page ID is included in the page ID ordered array 302 of FIG. 3 that is stored in the redo log buffer 210. If the page ID is not in the page ID ordered array, read processing is executed (506).

If the page ID is in the page ID ordered array, it is determined whether the redo flag for the page ID is set equal to 1 (508). For example, the redo log processor 212 of FIG. 2 determines the value of the redo flag of the page ID from the page ID ordered array 302 of FIG. 3. If the redo flag is not equal to 1 (i.e., the data page corresponding to the page ID is not currently being created/updated), a thread is started to process the log entries for the page ID (510). The thread processes log entries corresponding to the page ID to create/update a data page for the page ID from the log entries. In some examples, an update may only need to read data from SSD flash memory to SSD DRAM instead of creating a new data page. After the thread completes, page content (new page content) is provided from DRAM (512). For example, data of the data page is stored in DRAM of the storage 204 and at least a portion of the data can be returned to the host 202 in response to the read command.

More particularly, a background thread of the SSD repeatedly checks the bidirectional linked tables. Once a redo entry is found for a page ID, a new thread is started to execute a redo for the page ID (e.g., create a data page from the log entries of the page ID). All of the redo entries with the same page ID will be processed by the same thread. The next redo entry with a different page ID will be handled in the same way (i.e., a new thread is started for that page ID). This continues until a maximum number of threads is reached (e.g., maximum number of threads that the processor of the SSD has available). Within a thread, every redo entry with the same page ID is applied to the page data one by one. Once all of the redo entries of a page are applied and the new page data is written to flash memory, the corresponding page ID ordered array element is deleted and all of the bidirectional linked table elements belonging to this page ID are also deleted from the redo log buffer. Here, after the redo is complete, the page ID and the redo entries are cleared from the buffer. If there was a previous read command that needs to read the entire contents of the page, the contents of the page are taken directly out of memory and returned to the host. Otherwise, the contents of the page are removed from memory.

Implementations of the present disclosure provide one or more technical improvements. For example, implementations of the present disclosure provide that the only writes between the host and the SSD are redo logs. That is, no data pages and/or undo logs are written from the host to the SSD. As another example, implementations of the present disclosure ensure that all of the updated data pages during transactions will never be dirty after transactions are committed. That is, because data pages are created and/or updated using redo logs, integrity of the data stored in the data pages is intact. As a result, a dirty page list and an undo log are not needed. That is, because page data with uncommitted changes are not written to the SSD from host, integrity of the data stored in the data pages is intact. As another example, implementations of the present disclosure provide for redo processing to be executed continuously and asynchronously within the SSD. Any read request for a data page may require some redo records to be applied if the data page is not current (e.g., the redo processing updates an existing data page). As a result, the process of crash recovery spreads across all normal foreground transactions. Nothing is required at database startup, and crash recovery time and effort (the time and computation effort required to recreate the database) is greatly reduced.

Figure 6:
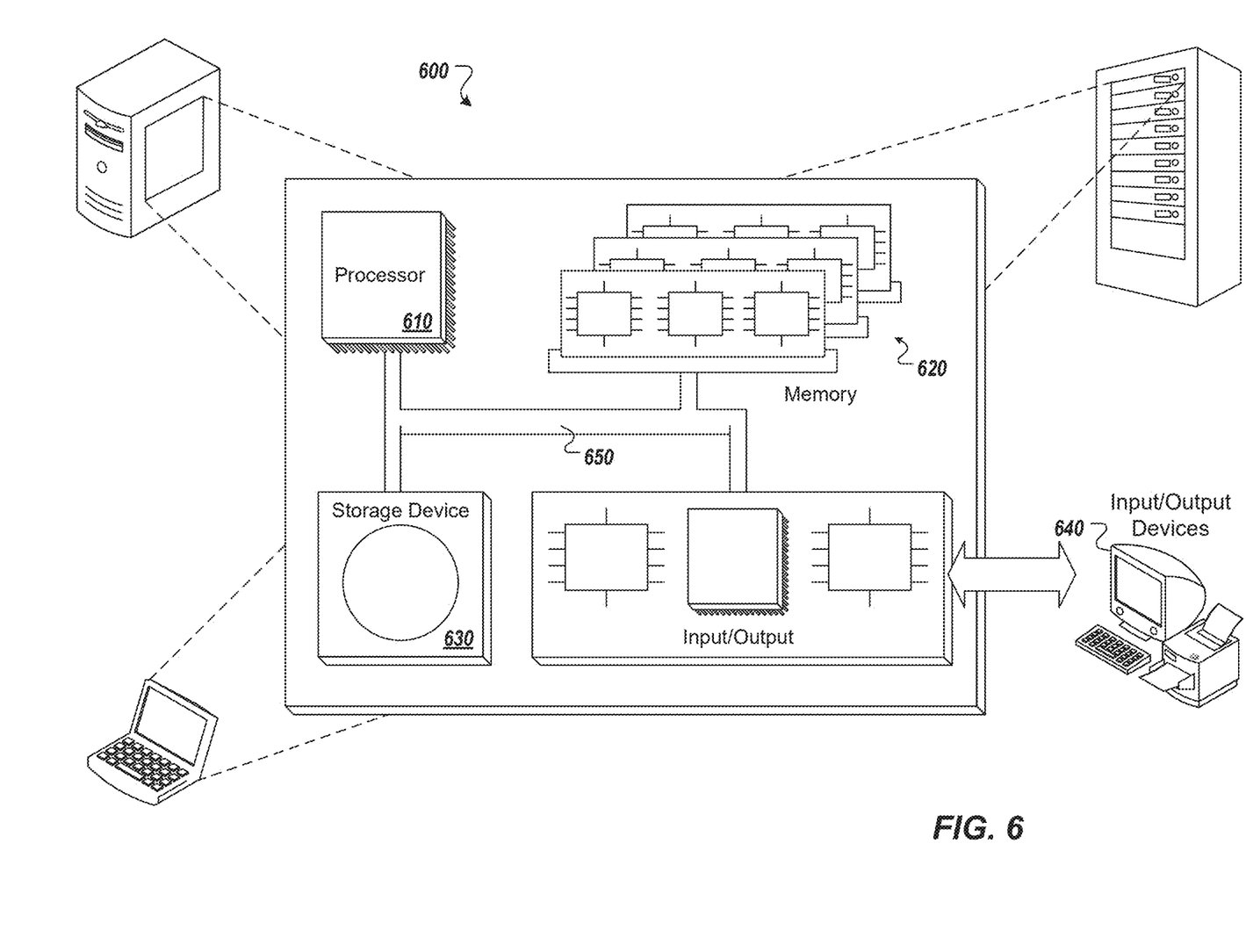
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for processing of redo logs in database systems, the method being executed by one or more processors and comprising:
    receiving, by a solid-state drive (SSD) and from a host, a write command to write content to memory, the content comprising a redo log of a database system, the redo log comprising a set of redo entries, each redo entry recording one or more changes to data in the database system;
    writing, by a redo log processor executed by at least one processor of the SSD, redo entries of the redo log to a redo log buffer, the redo log buffer comprising a first set of bidirectional links that each bidirectionally link redo entries of different pages and a second set of bidirectional links that each bidirectionally link redo entries of a same page, the redo log buffer comprising a page identifier (page ID) ordered array and a set of bidirectional linked tables, the redo entries being written to the bidirectional linked tables in the set of bidirectional linked tables; and
    executing, by the redo log processor, one or more of creating a data page and updating a data page in memory of the SSD, the data page being stored in memory of the SSD.

2. The method of claim 1, wherein a sub-set of bidirectional linked tables stores a set of redo entries corresponding to a respective page ID.

3. The method of claim 2, wherein one or more redo entries in the set of redo entries comprises a pointer that points to one other redo entry in the set of redo entries.

4. The method of claim 1, wherein each page ID in the page ID ordered array includes a pointer to a last redo entry in the set of bidirectional linked tables corresponding to the page ID.

5. The method of claim 1, wherein the data page is identified by a page ID in the page ID ordered array.

6. The method of claim 1, wherein a plurality of redo entries associated with a page ID are all processed by a same thread of the SSD to execute one or more of creating a data page and updating a data page.

7. The method of claim 1, wherein the host executes a database engine that processes queries, the write command being transmitted to the SSD in response to a query.

8. A non-transitory computer-readable storage medium coupled to one or more processors and having instructions stored thereon which, when executed by the one or more processors, cause the one or more processors to perform operations for processing of redo logs in database systems, the operations comprising:
    receiving, by a solid-state drive (SSD) and from a host, a write command to write content to memory, the content comprising a redo log of a database system, the redo log comprising a set of redo entries, each redo entry recording one or more changes to data in the database system;
    writing, by a redo log processor executed by at least one processor of the SSD, redo entries of the redo log to a redo log buffer, the redo log buffer comprising a first set of bidirectional links that each bidirectionally link redo entries of different pages and a second set of bidirectional links that each bidirectionally link redo entries of a same page, the redo log buffer comprising a page identifier (page ID) ordered array and a set of bidirectional linked tables, the redo entries being written to the bidirectional linked tables in the set of bidirectional linked tables; and
    executing, by the redo log processor, one or more of creating a data page and updating a data page in memory of the SSD, the data page being stored in memory of the SSD.

9. The non-transitory computer-readable storage medium of claim 8, wherein a sub-set of bidirectional linked tables stores a set of redo entries corresponding to a respective page ID.

10. The non-transitory computer-readable storage medium of claim 9, wherein one or more redo entries in the set of redo entries comprises a pointer that points to one other redo entry in the set of redo entries.

11. The non-transitory computer-readable storage medium of claim 8, wherein each page ID in the page ID ordered array includes a pointer to a last redo entry in the set of bidirectional linked tables corresponding to the page ID.

12. The non-transitory computer-readable storage medium of claim 8, wherein the data page is identified by a page ID in the page ID ordered array.

13. The non-transitory computer-readable storage medium of claim 8, wherein a plurality of redo entries associated with a page ID are all processed by a same thread of the SSD to execute one or more of creating a data page and updating a data page.

14. The non-transitory computer-readable storage medium of claim 8, wherein the host executes a database engine that processes queries, the write command being transmitted to the SSD in response to a query.

15. A system, comprising:
    a computing device; and
    a computer-readable storage device coupled to the computing device and having instructions stored thereon which, when executed by the computing device, cause the computing device to perform operations for processing of redo logs in database systems, the operations comprising:
        receiving, by a solid-state drive (SSD) and from a host, a write command to write content to memory, the content comprising a redo log of a database system, the redo log comprising a set of redo entries, each redo entry recording one or more changes to data in the database system;
        writing, by a redo log processor executed by at least one processor of the SSD, redo entries of the redo log to a redo log buffer, the redo log buffer comprising a first set of bidirectional links that each bidirectionally link redo entries of different pages and a second set of bidirectional links that each bidirectionally link redo entries of a same page, the redo log buffer comprising a page identifier (page ID) ordered array and a set of bidirectional linked tables, the redo entries being written to the bidirectional linked tables in the set of bidirectional linked tables; and
        executing, by the redo log processor, one or more of creating a data page and updating a data page in memory of the SSD, the data page being stored in memory of the SSD.

16. The system of claim 15, wherein a sub-set of bidirectional linked tables stores a set of redo entries corresponding to a respective page ID.

17. The system of claim 16, wherein one or more redo entries in the set of redo entries comprises a pointer that points to one other redo entry in the set of redo entries.

18. The system of claim 15, wherein each page ID in the page ID ordered array includes a pointer to a last redo entry in the set of bidirectional linked tables corresponding to the page ID.

19. The system of claim 15, wherein the data page is identified by a page ID in the page ID ordered array.

20. The system of claim 15, wherein a plurality of redo entries associated with a page ID are all processed by a same thread of the SSD to execute one or more of creating a data page and updating a data page.

* * * * *